US009558731B2

(12) United States Patent
Poulsen (10) Patent No.: US 9,558,731 B2
(45) Date of Patent: Jan. 31, 2017

(54) HEADPHONES USING MULTIPLEXED MICROPHONE SIGNALS TO ENABLE ACTIVE NOISE CANCELLATION

(71) Applicant: BlackBerry Limited, Waterloo (CA)

(72) Inventor: Jens Kristian Poulsen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/739,386

(22) Filed: Jun. 15, 2015

(65) Prior Publication Data

US 2016/0365082 A1 Dec. 15, 2016

(51) Int. Cl.
| | |
|---|---|
| *G10K 11/178* | (2006.01) |
| *H04R 5/033* | (2006.01) |
| *H04R 1/10* | (2006.01) |
| *H04J 4/00* | (2006.01) |

(52) U.S. Cl.
CPC ............ *G10K 11/1786* (2013.01); *H04J 4/00* (2013.01); *H04R 1/1041* (2013.01); *H04R 5/033* (2013.01); *G10K 2210/3013* (2013.01); *G10K 2210/3016* (2013.01); *G10K 2210/3216* (2013.01); *H04R 2420/09* (2013.01); *H04R 2460/01* (2013.01)

(58) Field of Classification Search
CPC ........................ G10K 11/1786; H04R 1/1041
USPC ................. 381/2, 17, 71.1, 71.6, 71.8, 73.1, 74,381/94.2, 94.7, 71.3, 93; 455/575.2; 181/129; 704/210, 226, 227
See application file for complete search history.

(56) References Cited

U.S. PATENT DOCUMENTS

| | | | | |
|---|---|---|---|---|
| 5,375,174 A | * | 12/1994 | Denenberg | G10K 11/1788 381/71.6 |
| 5,546,467 A | * | 8/1996 | Denenberg | H04B 15/00 340/12.32 |
| 6,078,672 A | * | 6/2000 | Saunders | G10K 11/178 381/71.6 |
| 6,363,345 B1 | * | 3/2002 | Marash | G10L 25/78 704/205 |
| 7,366,662 B2 | * | 4/2008 | Visser | G10L 21/0208 704/227 |
| 7,367,422 B2 | * | 5/2008 | Harris, Jr. | H04R 1/1083 181/129 |
| 7,464,029 B2 | * | 12/2008 | Visser | G10L 21/0272 704/210 |
| 8,175,291 B2 | * | 5/2012 | Chan | G10L 21/0208 381/94.7 |
| 8,718,294 B2 | * | 5/2014 | Terlizzi | G02B 6/3817 381/122 |
| 8,781,147 B1 | | 7/2014 | Giuroiu | |

(Continued)

FOREIGN PATENT DOCUMENTS

EP    2587833    5/2013

OTHER PUBLICATIONS

Draft Specification for SoundWire, Mipi Alliance, Dec. 9, 2014.

(Continued)

*Primary Examiner* — Gerald Gauthier
(74) *Attorney, Agent, or Firm* — Rowand LLP (57) ABSTRACT

Headphones or a headset to enable active noise cancellation or binaural recording. Microphone signals are multiplexed within the headphones/headset and are conveyed to an attached device using a single contact point in the audio plug. The audio plug may be a conventional four connector audio plug to provide backwards compatibility. The multiplexing is analog multiplexing, and may be time-domain or frequency-domain multiplexing.

20 Claims, 8 Drawing Sheets

(56) References Cited

U.S. PATENT DOCUMENTS

| | | | |
|---|---|---|---|
| 9,171,537 B2* | 10/2015 | Davidson | G10K 11/178 |
| 2003/0185403 A1* | 10/2003 | Sibbald | G10K 11/1788 |
| | | | 381/71.6 |
| 2005/0238180 A1* | 10/2005 | Chen | G10K 11/1788 |
| | | | 381/71.6 |
| 2007/0147640 A1 | 6/2007 | Mottier | |
| 2007/0177741 A1* | 8/2007 | Williamson | H04R 1/1083 |
| | | | 381/71.6 |
| 2007/0242834 A1* | 10/2007 | Coutinho | G10K 11/1788 |
| | | | 381/71.8 |
| 2008/0076489 A1* | 3/2008 | Rosener | H04M 1/6066 |
| | | | 455/575.2 |
| 2009/0310795 A1* | 12/2009 | Apsey | G10L 21/0208 |
| | | | 381/71.1 |
| 2010/0150367 A1* | 6/2010 | Mizuno | G10K 11/1782 |
| | | | 381/71.6 |
| 2010/0202626 A1* | 8/2010 | Shiori | G06F 3/017 |
| | | | 381/74 |
| 2011/0002476 A1* | 1/2011 | Morishima | G10K 11/178 |
| | | | 381/71.6 |
| 2011/0026724 A1* | 2/2011 | Doclo | G10K 11/178 |
| | | | 381/71.8 |
| 2012/0057722 A1* | 3/2012 | Osako | H04R 3/005 |
| | | | 381/94.2 |
| 2012/0057723 A1* | 3/2012 | Suzuki | H04R 5/04 |
| | | | 381/94.7 |
| 2012/0144078 A1 | 6/2012 | Poulsen | |
| 2012/0177213 A1* | 7/2012 | Le Faucheur | G10K 11/1784 |
| | | | 381/71.6 |
| 2013/0259255 A1* | 10/2013 | Schul | H04R 1/1041 |
| | | | 381/74 |
| 2014/0126734 A1* | 5/2014 | Gauger, Jr. | H04R 3/002 |
| | | | 381/71.6 |
| 2014/0126736 A1* | 5/2014 | Gauger, Jr. | G10K 11/178 |
| | | | 381/71.6 |
| 2014/0205109 A1* | 7/2014 | Theiler | H04R 1/1083 |
| | | | 381/74 |
| 2015/0003622 A1* | 1/2015 | Lee | H04R 1/1033 |
| | | | 381/71.6 |
| 2015/0092951 A1* | 4/2015 | Ou | H03G 3/20 |
| | | | 381/71.6 |
| 2015/0172815 A1* | 6/2015 | Park | H04R 3/02 |
| | | | 381/93 |
| 2015/0194144 A1* | 7/2015 | Park | G10K 11/175 |
| | | | 381/73.1 |
| 2015/0350762 A1* | 12/2015 | Birger | H04R 1/1016 |
| | | | 381/74 |
| 2016/0037281 A1* | 2/2016 | Atkins | G06F 17/156 |
| | | | 381/17 |

OTHER PUBLICATIONS

International Telecommunication Union, "Telecommunication Standardization Sector", Study Period 2013-2016, Nov. 2013, COM 12-C-0140-E.

Partial European Search Report dated Nov. 7, 2016.

\* cited by examiner

HEADPHONES USING MULTIPLEXED MICROPHONE SIGNALS TO ENABLE ACTIVE NOISE CANCELLATION

FIELD

The present application generally relates to audio headphones and, in particular, to headphones with multiplexed microphone signals.

BACKGROUND

Higher-end headphones and headsets sometimes feature active noise cancellation (ANC). Headphones with ANC typically require two or more microphones and complex circuitry or processing to create suitable cancellation or compensation signals to be fed to the earphones. This often also requires battery power within the headphones or headset, which is inconvenient. Attempts to do ANC processing outside of the headphones or headset have typically involved digitization of the microphone signals, or customization of the audio jack (i.e. plug-and-socket) to add additional non-standard connectors in order to route the microphone signals. However, this adds extra cost or the need for special audio jacks that are not backwards compatible with existing equipment.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, some embodiments in this disclosure include an audio headset that includes an audio plug with four connectors. The audio plug includes one connector connected to ground, one to left speaker, one to right speaker, and the last connector dedicated to convey signals from two or more microphones that are multiplexed onto a single connector. The connectors are located at positions that are compatible with existing four connector audio sockets to provide backwards compatibility with audio sockets that connect to two speakers, a microphone and ground line of existing audio headsets. The two or more microphones can provide binaural recording capabilities at a device connected to the audio headset that includes a standard socket with four connectors, and/or active noise cancellation ("ANC") for both speakers of the audio headset, presuming that each of the speakers is proximal a respective microphone.

In some embodiments, the ANC processing can occur at a connected device that receives two or more microphone signals, and produces one or more noise cancellation signals that are inserted into sound data output to the speakers. Hence, the ANC processing occurs at the device, rather than in the audio headset itself, which reduces the cost of the audio headset by obviating the need for a circuit at the audio headset to produce the noise cancellation signals.

In one aspect, the present application describes headphones to enable active noise cancellation. The headphones include left and right speakers contained in left and right speaker housings; at least one microphone in the left speaker housing and at least one microphone in the right speaker housing, each microphone producing a respective microphone signal; an analog multiplexer for multiplexing the respective microphone signals into a combined signal; and a multi-wire cord having a ground wire, a left speaker signal wire coupled to the left speaker, a right speaker signal wire coupled to the right speaker, and a microphone output wire coupled to the analog multiplexer to receive the combined signal, wherein the multi-wire cord terminates in an audio plug.

In another aspect, the present application describes headphones to enable active noise cancellation, including at least two speakers; at least two microphones, each microphone producing a respective microphone signal; an analog multiplexer for multiplexing the respective microphone signals into a combined signal; and a multi-wire cord having a ground wire, at least two speaker signal wires each coupled to a respective one of the speakers, and a microphone output wire coupled to the analog multiplexer to receive the combined signal, wherein the multi-wire cord terminates in an audio plug.

In yet another aspect, the present application describes a headset to enable active noise cancellation, including left and right speakers contained in left and right speaker housings; at least one microphone in the left speaker housing and at least one microphone in the right speaker housing, and a third microphone, each microphone producing a respective microphone signal; an analog multiplexer for multiplexing the respective microphone signals into a combined signal; and a multi-wire cord having a ground wire, a left speaker signal wire coupled to the left speaker, a right speaker signal wire coupled to the right speaker, and a microphone output wire coupled to the analog multiplexer to receive the combined signal, wherein the multi-wire cord terminates in an audio plug.

In yet a further aspect, the present application describes non-transitory computer-readable media storing computer-executable program instructions which, when executed, configured a processor to perform the described methods.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The following description may make reference to headphones or headsets. Headphones are typically understood to be a pair of speakers, one for each of the left and right ears, mounted to a headband. In some cases, headphones may not have a headband, such as with ear-bud type headphones. A headset is typically understood to be headphones with at least one microphone for receiving audio input from the user. For example, a headset may be used for online gaming, telephone calls, recording studios, or other such situations. The present application is not intended to be limited to either headphones or headsets. At times, the terms "headphones" or "headset" may be used interchangeably herein. It will be understood that to the extent any detailed embodiments below describe headphones with suitable modifications those embodiments may be implemented with a headset, and vice versa.

The following description also refers to audio jacks, which are intended to mean an audio plug-and-socket, wherein the plug and socket each have respective connectors that are intended to pass audio signals when the plug is inserted in the socket so as to align connectors on the plug with corresponding connectors in the socket. The terms "plug-and-socket" and "jack" may be used interchangeably herein.

Headphones and headsets sometimes feature noise reduction technology. The noise reduction can be accomplished using either passive or active methods. The passive methods have the advantage of using mechanical means only and thereby requiring no power source but often the disadvantage of a larger and more bulky design to include the acoustic absorptive or reflective materials. The active methods provide active noise compensation (ANC) by measuring the ambient noise level and producing a suitable anti-noise signal that is sent to the headphones or earphones so as to significantly attenuate the noise level at the ear. The advantage of using ANC is in the range 5-25 dB of attenuation in a frequency band of width 1-3 kHz. An often used application of ANC is noise suppression during flight, because of the high noise level and the desire for a good audio experience, for example when using the in-flight entertainment system. By using headphones equipped with ANC, the fatigue associated with the in-flight cabin experience may be reduced.

In order to provide for ANC, at least two microphones are needed in the headphones or headset, one proximate to each ear of the user, because the noise level varies with distance and time. ANC is usually either feed-forward or feed-backward noise suppression, although in some more expensive solutions may use four microphones in a dual system employing both feed-forward and feed-backward noise suppression.

Feed-forward systems work by measuring the noise outside the earphones and predicting the noise level inside the earphones, using estimates of the acoustic transfer function from the outside to the inside of the earphones. Feed-backward systems measure the sound pressure level directly inside the earphone and compare this to the desired sound pressure level. Due to the delay in processing, feed-backward systems may suffer from a lower bandwidth of the noise suppression system but have the advantage of not needing a precisely determined transfer function between the inside and outside of the earphones.

In some embodiments, the noise cancelling microphones may also be used for bi-neural recording and thereby enable bi-neural phone calls providing a more realistic sound environment. Bi-neural recordings enable very realistic playback experience because the sound is recorded right at each ear and thereby enables authentic playback.

Existing headphone ANC systems situate the control circuit within the headphones due to the limited (four) number of terminals on the standard 3.5 mm audio jack. The ANC circuit also requires power, which means the headphones will need single use or rechargeable batteries, which is inconvenient. Overall, the additional circuit elements add significant cost and weight to the headphones, thereby limiting the consumer space where this solution is used. Due to the need to power the ANC process, the headphones may require new batteries on a regular basis or may need to have its batteries recharged on a regular basis.

Some proposals have been made to perform ANC processing in a separate device, such as a handheld device containing a processor. Unfortunately, existing 3 and 4 terminal audio jacks are unable to provide the ANC microphone signals to the separate device via the headphone or headset cable. One option is to introduce a new audio jack having 5, 6 or more terminals in order to route the ANC microphone signal to the separate device. This creates problems with backward compatibility and limits the number of ANC microphones based on the number of mechanical terminals added to the audio jack (and wires to the cable). Another option is full digitization of the ANC microphone signals in the headphones or headset, which can then be relayed to a separate device, for example using wireless technology or via the headphone cable. These solutions can be high cost, may still require a power source (e.g. battery) in the headphones or headset, may introduce ground bounce issues thereby affecting the playback audio quality, and may be not be backward compatible with existing 3 or 4 terminal audio sockets.

In accordance with one aspect of the present application, multiple ANC microphone signals are analog multiplexed into a combined analog signal requiring only one wire in the headphone cable. The use of analog multiplexing avoids potential ground bounce issues with mixing digital and analog solutions, and can be implemented in very cost effective circuitry without requiring a local power source (i.e. battery) in the headphones or headset. Such an arrangement may be implemented using an existing 4-terminal audio plug, thereby making the headphones or headset backwards compatible with existing audio sockets.

Figure 1:
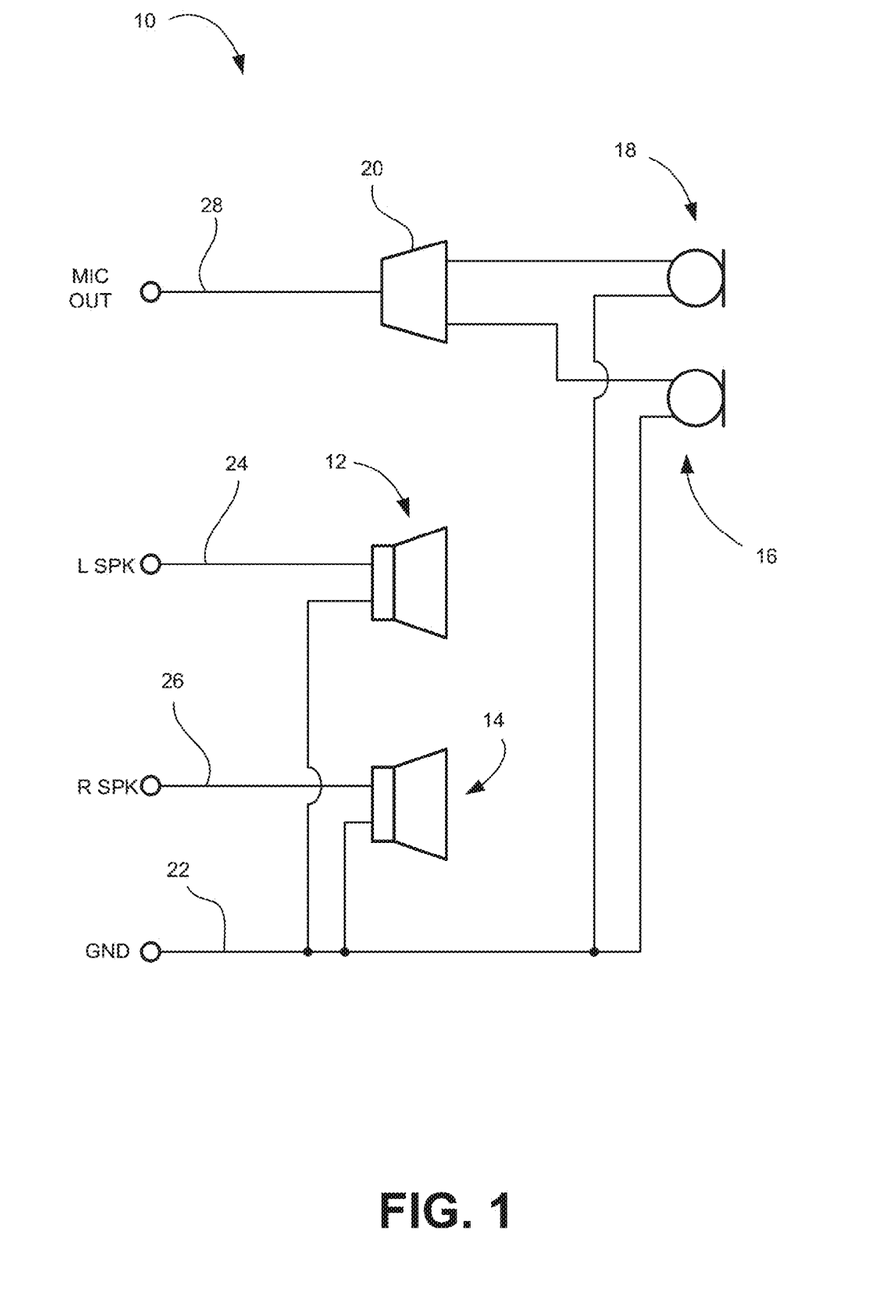
FIG. 1 shows a simplified circuit diagram of one embodiment of headphones with analog multiplexing of ANC microphone signals.

Reference is now made to FIG. 1, which shows a simplified circuit diagram of one example set of headphones 10. The headphones 10 include a left speaker 12 and a right speaker 14. The left speaker 12 receives a left speaker signal 24 and the right speaker 14 receives a right speaker signal 26.

The headphones 10 also include at least two microphones for ANC: a left microphone 16 and a right microphone 18. The left microphone 16 and right microphone 18 may be feed-forward or feed-backward.

The headphones 10 further include an analog multiplexer 20 for combining the signals from left microphone 16 and right microphone 18 into a combined mic out signal 28. The analog multiplexer 20 uses either time-domain multiplexing or frequency-domain multiplexing. In embodiments using frequency-domain multiplexing, some embodiments may use amplitude modulation, and some may use frequency modulation.

In some embodiments, the analog multiplexer 20 operates at a multiplex frequency (whether time or frequency multiplexing) of between 100-700 kHz to remain compatible with current filter components. The analog multiplexer 20 is implemented so as to ensure the current consumption associated with the multiplexer is a steady current or varies on a periodic basis and that the periodicity is beyond the range of human hearing.

The headphones 10 have four input/output lines: the combined mic out signal 28, the left speaker signal 24, the right speaker signal 26, and a ground connection 22. Accordingly, the headphones 20 may be implemented using a conventional 4-wire cord and 4-terminal connector. The mic out signal 28 supplies detected ambient noise signals to a handheld device or other computing device connected to the headphones 20, which then performs the calculations and processing for ANC. Suitable noise cancellation signals are then provided to the headphones 10 via the left speaker signal 24 and right speaker signal 26.

It will be appreciated that although two microphones (left microphone 16 and right microphone 18) are shown in this example, that other embodiments may feature more microphones without requiring additional connectors in the audio plug since all the microphone signals are analog multiplexed onto a single mic out line.

Each speaker 12 and 14 can comprise one or more of an over-ear speaker, an on-ear speaker and in-ear speaker. In some implementations speakers 12, 14 can include distinct speaker components or a single speaker device; for example, speakers 12, 14 can each include different speaker devices, including, but not limited to, a tweeter and a woofer.

Figure 2:
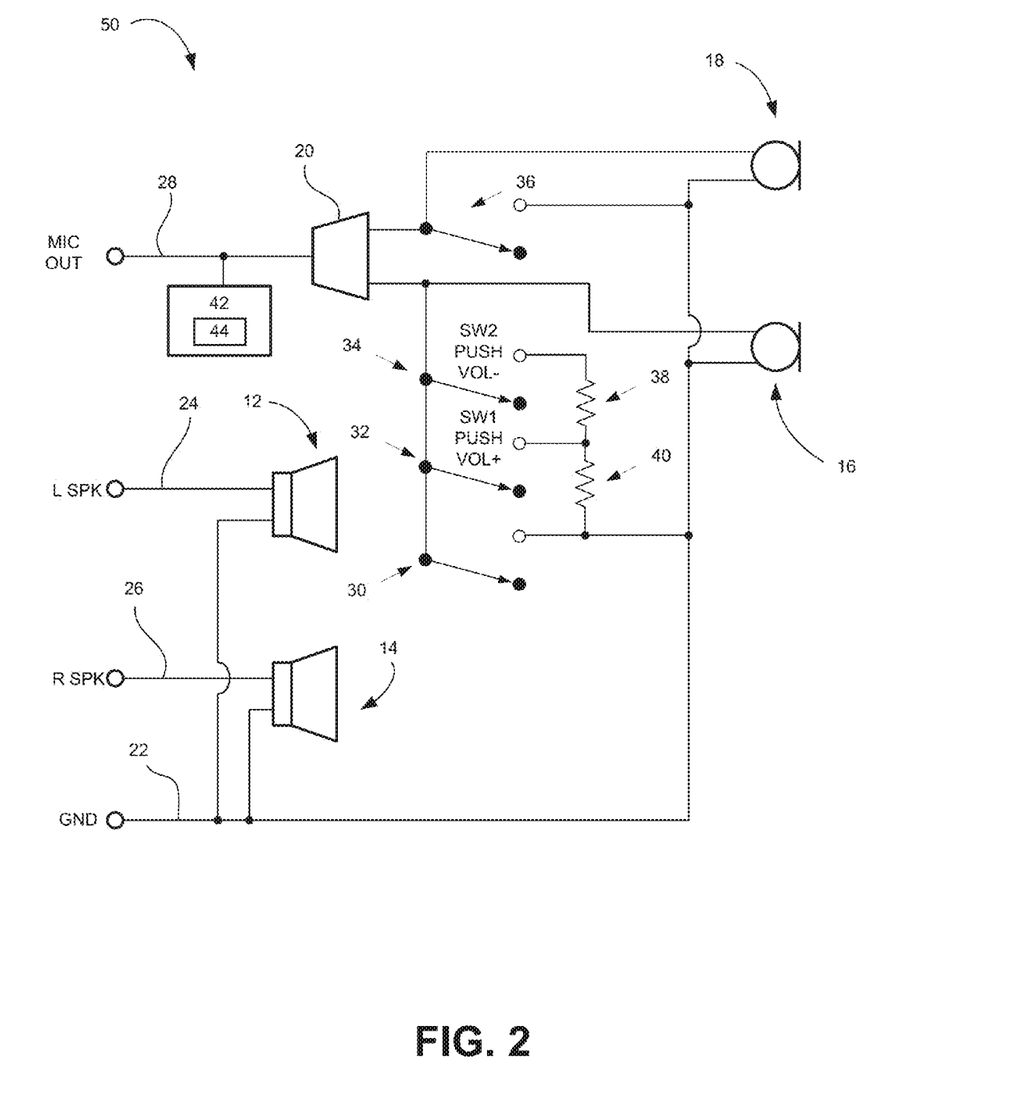
FIG. 2 shows a simplified circuit diagram of one embodiment of a headset with analog multiplexing of microphone signals.

Reference is now made to FIG. 2, which shows a simplified diagram of an example headset 50. The headset 50 includes the left speaker 12 receiving the left speaker signal 24 and the right speaker 14 receiving the right speaker signal 26, and includes the left microphone 16 and right microphone 18, and the analog multiplexer 20. Additional microphones may be included in some embodiments.

In this example, the headset 50 further includes one or more input devices 30, 32, 34, 36 to control one or more settings or functions. Examples include the volume of the first speaker 12 and second speaker 14, muting of the left microphone 16 and right microphone 18, a push-to-talk function, or other such operations. In particular, one or more input devices 30, 32, 34, 36 can be used to control volume of the speakers 12, 14, mute microphones 16, 18, initiate a push-to-talk (PTT) function, and/or control playing of audio files and the like at a device with which headset 50 is mated. In some implementations, the input devices 30, 32, 34, 36 may be implemented by switches and may have associated resistors 38 and 40, and may be connected directly to the mic out signal line 28. For example, input device 30 is configured to short one or more of the left microphone 16 and right microphone 18 to ground line 22, for example in a playback-in-flight mode and/or an audio device and the like.

In general, actuation of an input device 30, 32, 34, 36 can be detected by a connected audio device, for example by the audio device detecting impedance changes within audio headset 50, and the audio device may then respond accordingly. For example, as depicted in FIG. 2, audio headset 50 includes resistors 38, 40 which, when one of input devices 32, 34 are actuated, cause a change of impedance on the mic out signal line 28 of the microphones 16, 18. However, in some other embodiments, headset 50 can be adapted to include tone or test pulse generation components that produce pulses or tones when one or more of the input devices 30, 32, 34, 36 are actuated, the tones conveyed to a mated audio device to control audio functionality of the audio device. In some implementations, such test pulses or tones can be outside an audible hearing range of human beings, and hence be inaudible to human beings.

As depicted, each of the input devices 30, 32, 34, 36 may be a respective actuatable switch, however other types of input devices are within the scope of respective implementations.

In other implementations, headset 50 can include further input devices, which can be similar or different from input devices 30, 32, 34, 36. In yet further implementations, headset 50 can further include one or more indicator output devices including, but not limited to, one or more displays, LEDs (light emitting diodes) and/or other types of indicator output devices.

As described above, the input devices 30, 32, 34, 36 in this example are each an actuatable switch, which can be implemented as a button, a push button, a slider switch, or the like, mounted in a chassis or the like. In this example embodiment, input device 32 comprises a volume increase push button, input device 34 comprises a volume decrease push button, input device 30 comprises a flight/mute switch, and input device 36 comprises a push-to-talk button. Furthermore, while the headset 50 includes four input devices 30, 32, 34, 36 in other implementations, the headset 50 can include fewer than four input devices and more than four input devices. In one example, the flight/mute switch may be implemented using a slider switch (as depicted) or a locking switch for in-cabin flight applications; in other words, such a slider switch provides backwards compatibility of the present four-connector audio plug to three-connector audio sockets, where shorting of connectors 28, 24 can provide a stable ground connection.

It is further appreciated that headset 50 includes audio cables connecting microphones 16, 18 and speakers 12, 14 to other components of headset 50, as well as an audio cable connecting audio plug to other components of headset 50. While not depicted headset 50 may include EMI (electromagnetic interference) filtering components, including, but not limited to, capacitors, inductors, ferrite beads, resistors, and the like. In some implementations, microphones 16, 18 and speakers 12, 14 may share the same ground 22 line inside an audio cable, while in other implementations, a separate respective ground line may be used for each microphone 16, 18 and each speakers 12, 14 with each separate respective ground line within the cable connected to and/or merged at the audio plug.

As depicted in FIG. 2, in this example headset 50 may include a memory 42 connected to the mic out signal line 28. The memory 42 may store respective acoustic transfer functions 44 between the left microphone 16 and the left speaker 12, and between the right microphone 18 and the right speaker 14. More generally, when present, memory 42 may be accessible via one or more of connectors 22, 24, 26, 28 of audio plug such that the respective acoustic transfer functions 44 stored at memory 42 are accessible from an external device via audio plug. For example, as depicted memory 42 is accessible via connector port for the mic out signal 28, though in other implementations, memory 42 can be accessible via another connector.

Furthermore, a device connected to headset 50 may determine an acoustic transfer function based on audio data received from microphones 16, 18, and upload the determined acoustic transfer function 44 to memory 42, for example via connector 28. In general, memory 42 comprises one or more of a flash memory, a non-volatile memory, a non-transitory memory, a memory unit and/or a memory module, and acoustic transfer functions 44 may be stored persistently. For example, when headset 50 is mated with a new device, the new device may read acoustic transfer functions 44 and process sound data and microphone data received from headset 50 accordingly, and/or update acoustic transfer functions 44.

Figure 3:
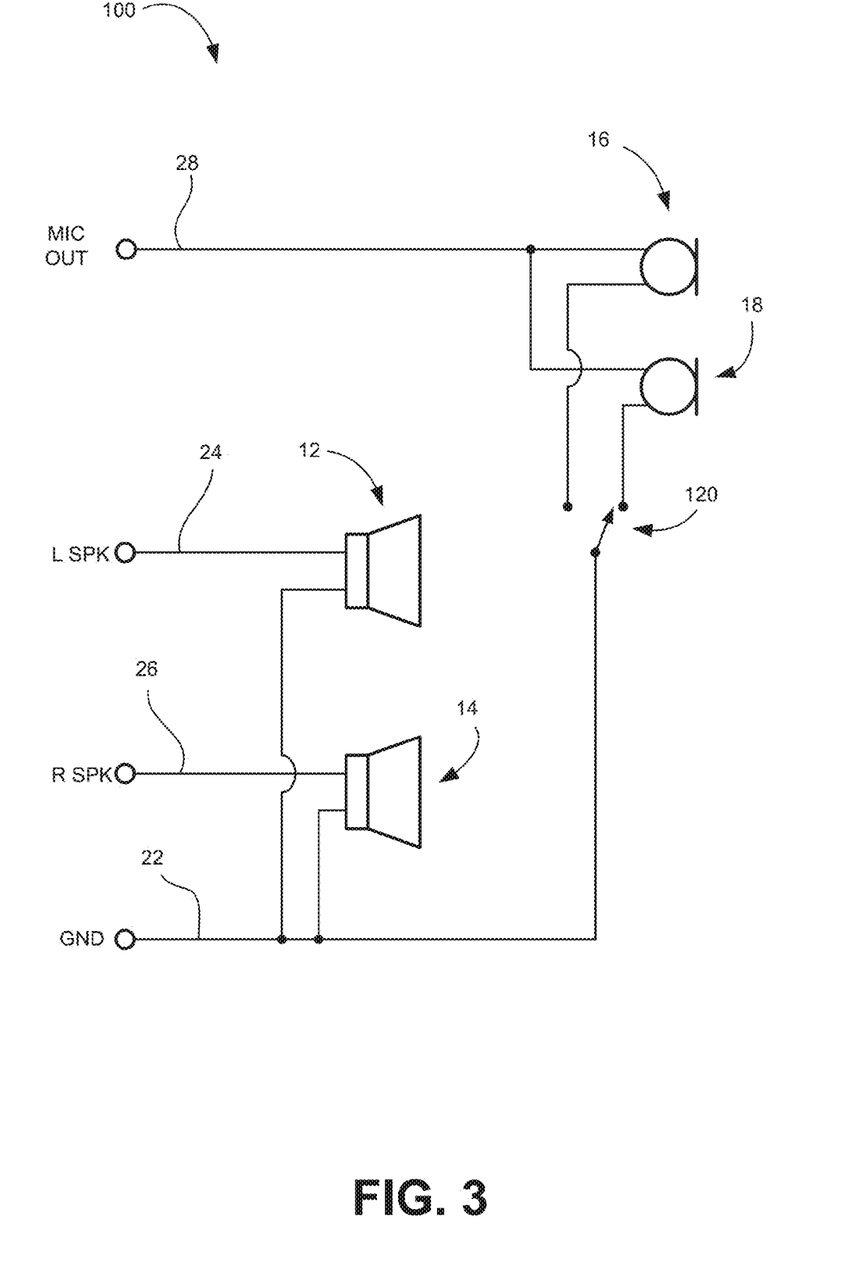
FIG. 3 shows a simplified circuit diagram of another embodiment of headphones with analog multiplexing of ANC microphone signals.

Reference is now made to FIG. 3, which shows a simplified circuit diagram of one example time-multiplexed embodiment of headphones 100. The headphones 100 feature the left speaker 12, the right speaker 14, the left microphone 16, and the right microphone 18. In this embodiment, the analog multiplexer is implemented by way of a switch 120. The switch 120 alternately connects the left microphone 16 and right microphone 18 to ground 22, thereby time multiplexing the signals output via the microphones 16 and 18 on the mic out signal 28 line.

The switch 120 may be implemented using, for example, NMOS devices for connecting either the left microphone 16 or right microphone 18 to ground 22 under control of a switch signal. In another embodiment, the switch 120 may be implemented between the mic out signal 28 terminal and the microphones 16 and 18. Such a switch 120 would be a "pull-up" switch rather than the illustrated "pull-down" switch, and may be implemented using PMOS devices, for example. In some embodiments, the switch 120 may be implemented using a dual-gate transistor, e.g. a PMOS dual-gate device, with one gate attached to the electret membrane and one gate used for the switching action, i.e. the switch, amplifier and microphone are combined into a single device.

The frequency response of typical microphones, such as electret microphones, is very high due to the fast frequency response of high-impedance Junction Field Effect Transistors (JFET), meaning that the switch 120 is able to switch between the two microphones 16 and 18 reasonably fast without necessarily running into problems with settling time and transients. The main limitation to switching speed comes from the external components that may be used for EMI filtering and the capacitance of the microphone cable itself.

Figure 4:
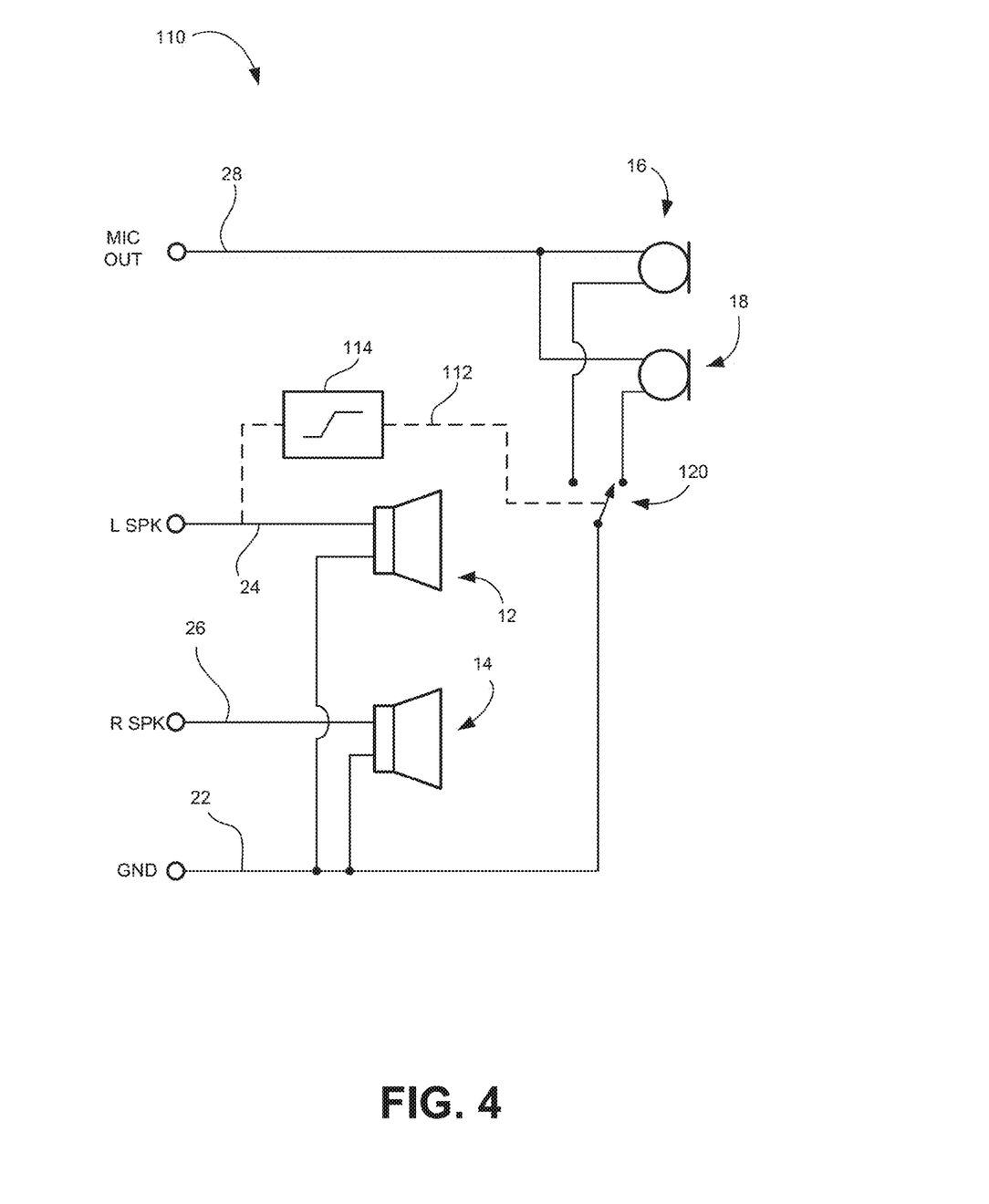
FIG. 4 shows a simplified circuit diagram for yet a further embodiment of headphones with analog multiplexing of ANC microphone signals.

Reference is now made to FIG. 4, which shows one example embodiment of the headphones 110 in which the switch 120 is controlled by a switch signal 112. The switch signal 112 may be supplied to the headphones 110 over one of the speaker connections, such as the left speaker connection that receives left speaker signal 24. The switch signal 112 may be at a sufficiently high frequency that it does not affect the audio quality and is imperceptible to the listener. For example, the switch clock signal may be at 192 kHz or a multiple thereof. A clock extraction circuit 114, e.g. a high pass filter, delay locked loop (DLL) or phase locked loop (PLL), may be used to filter the incoming left speaker signal 24 so as to extract the switch signal 112. The clock extraction circuit 114 may be powered by connections to ground line 22 and mic out signal line 28 (i.e. the microphone bias line). Typically, the switching frequency would be at least twice the required bandwidth of the desired signal. In practical applications, the switching frequency may be in the frequency range 100-800 kHz to reduce losses and reduce EMI problems. It may be noticed that a switching signal of 192 kHz would allow two samples from the left speaker and two samples from the right speaker to be taken, if the final output sample rate was 48 kHz, i.e. this would represent an oversampled system. Similarly, this configuration allows exactly one sample per channel if 4 microphone channels are used and the output sample rate is 48 kHz (which is a standard sample rate in telecom applications). If there is no clock signal present on left channel signal 24, the switch 120 may default to a known position, e.g. always switch on the left microphone to guarantee backwards compatibility with older systems. This position may also be chosen initially and default until a reliable clock signal has been detected on line 24.

It will be appreciated that the switch signal 112 may be supplied via the left speaker signal 24 or right speaker signal 26. In some embodiments, the microphone bias itself (mic out signal 28) may be used to transmit the clock signal, e.g. by varying the microphone bias voltage periodically such that voltage modulation selects the microphone, while the microphones themselves modulate the current consumption.

When implementing the microphone switches, it may be an advantage to ensure there is no overlap between the switching operation (break-before-make) to avoid interference between the signals, though it is also possible to allow some overlap where currents from both microphones flow simultaneously in the microphone line 28. The switches may include Electrostatic Discharge (ESD) protection for safety reasons. EMI filtering of the signals may be advantageous and may be located close to the microphones in order to avoid the switches producing interference due to non-linearities.

Figure 5:
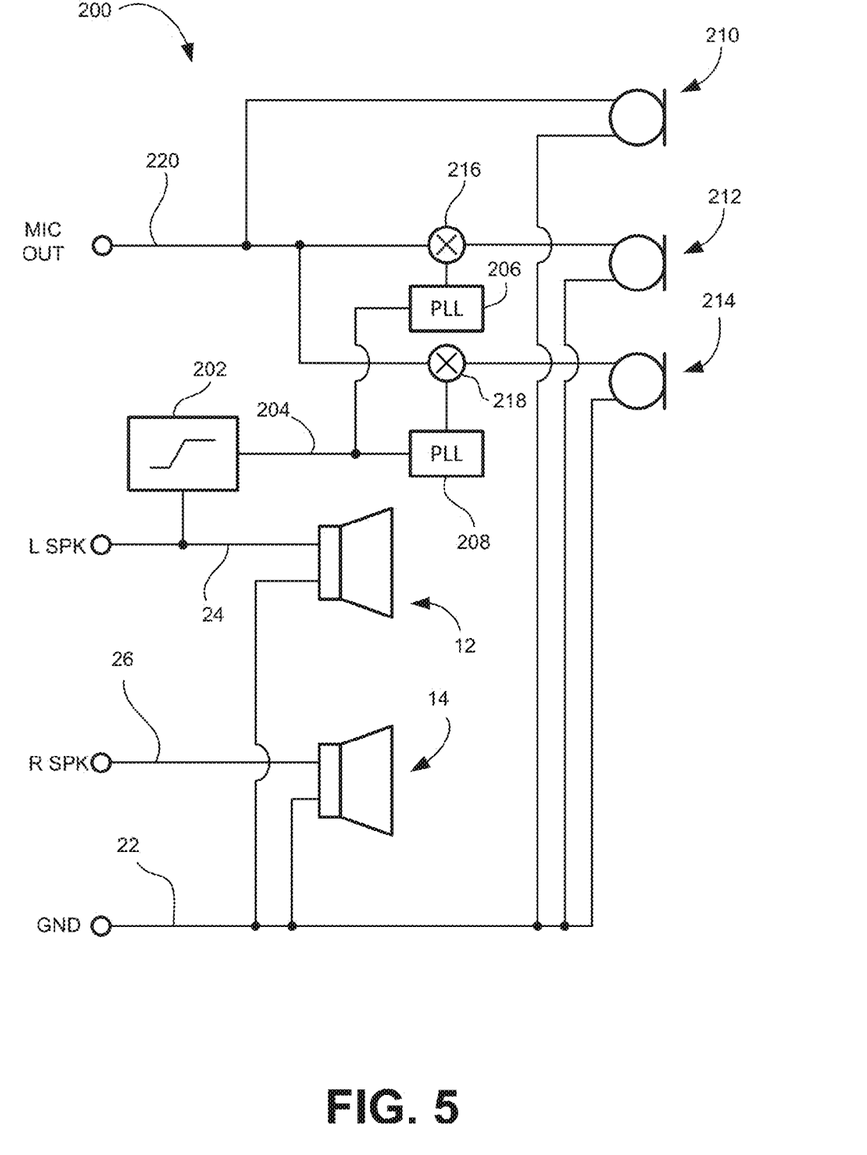
FIG. 5 shows a simplified circuit diagram for one embodiment of a headset with frequency-domain multiplexing of ANC microphone signals.

Reference will now be made to FIG. 5, which shows one example embodiment of a headset 200 using frequency multiplexing utilizing amplitude modulation (AM) of the microphone signals. This example is directed to a headset that includes a microphone for user audio communication, as well as microphones for ANC.

The headset 200 includes the left speaker 12 and right speaker 14, receiving the left speaker signal 24 and right speaker signal 26, respectively. The headset 200 further includes a main microphone 210 and two ANC microphones: a left microphone 212 and a right microphone 214. All of the microphones 210, 212, 214 are output through the single mic out terminal, although multiplexed into different channels. In this example, the main microphone 210 is connected without any frequency shifting, i.e. at a carrier of 0 Hz. The left and right microphones 212, 214 are shifted to different frequency channels using multipliers 216 & 218. These multipliers will AM-modulate the carrier and thereby enable the conveying of information from multiple microphones simultaneously. In this embodiment, a first phase-locked loop (PLL) 206 shifts the left microphone 212 output to a first frequency channel and a second phase-locked loop (PLL) 208 shifts the right microphone 214 output to a second frequency channel different from the first frequency channel, selected to avoid interference from harmonics, EMI, etc. One consideration in the design is the delay associated with the filtering of the received AM modulated signals. Therefore, a larger bandwidth than required by audio constraints alone may be chosen for the modulated signals and the demodulation of these signals in order to reduce the latency of the system.

The PLLs 206 and 208 may be driven by an input carrier signal 204, which may be supplied via the left speaker signal 24 or right speaker signal 26, for example. The input carrier signal 204 may be put through a highpass filter, delay locked loop (DLL), PLL or other clock extraction unit 202 before being input to the PLLs 206, 208. In some embodiments, the signal provided to the speaker 12 may be filtered, and in other cases, the signal may be feed directly to the speaker.

In this example embodiment, the microphone signals are amplitude modulated, since they are simply shifted in frequency to a carrier frequency corresponding to the frequency of the signal generated by the respective PLLs 206, 208. In one example implementation, the PLL 206 generates a 192 kHz signal and the PLL 208 generates a 384 kHz signal. In some embodiments, the PLL 206 may not be needed if the received input carrier signal 204 is at the desired carrier frequency and is sufficiently clean for use as a carrier for the multiplexed microphone signal.

The bandwidth allocated for each channel would normally be in the range of 16 kHz to 32 kHz, but could be larger or smaller depending on other constraints such as latency requirements. Typical microphones require no more than a 20 kHz bandwidth and the adult human hearing range is normally even lower.

Figure 6:
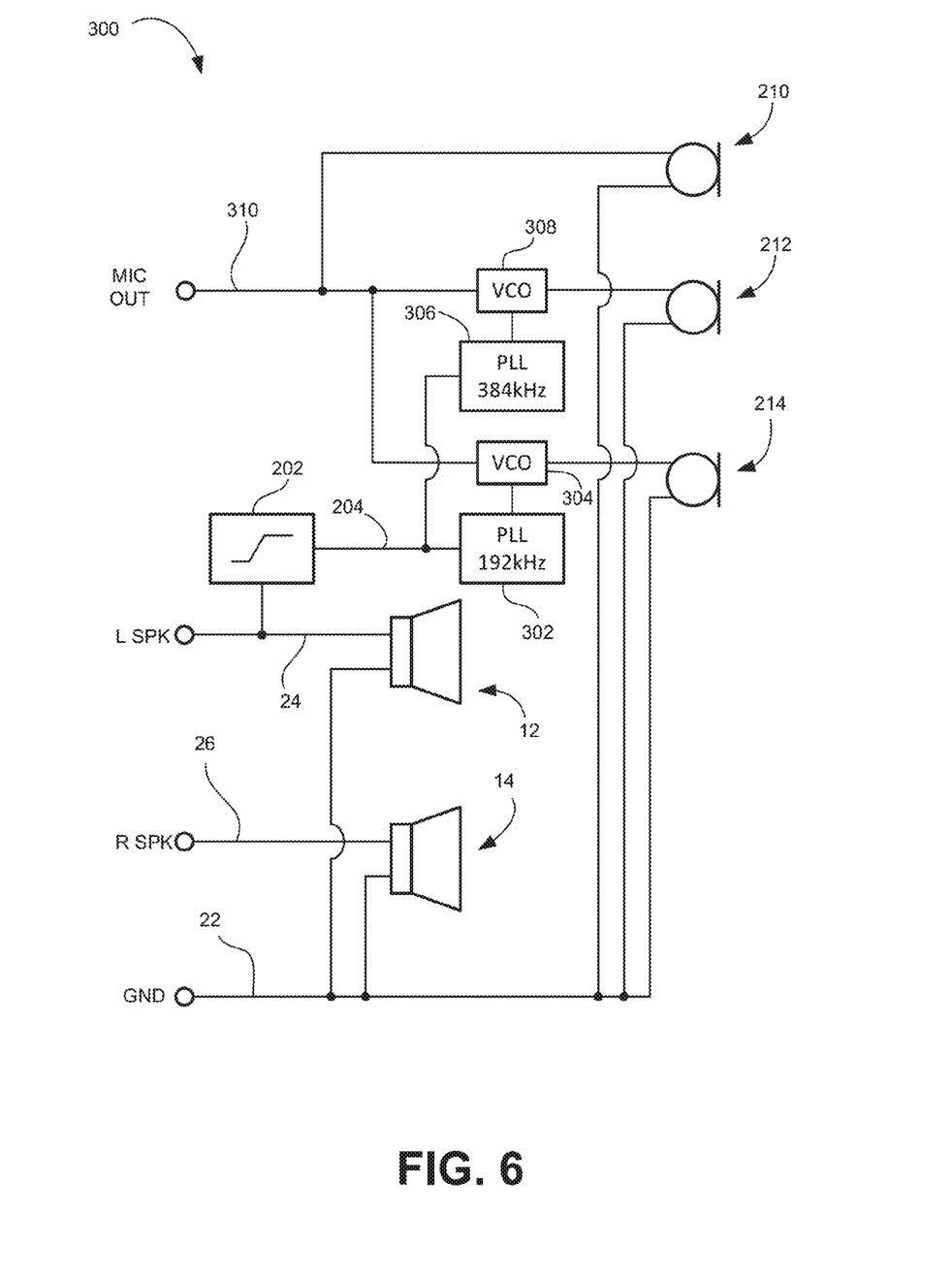
FIG. 6 shows a simplified circuit diagram for another embodiment of a headset with frequency-domain multiplexing of ANC microphone signals.

Yet another example embodiment of a headset 300 is illustrated by way of simplified circuit diagram in FIG. 6. In this example, the headset 300 uses frequency multiplexing with frequency modulation for multiplexing the microphone signals. Clock filtering unit 202 can represent a DLL, a PLL, a highpass or bandpass filter or similar clock recovery/filtering circuit. The input carrier signal 204 is input PLLs 302 and 306, which generate carrier signals at the desired frequencies for use by voltage-controlled oscillators (VCOs) 304 and 308. The VCOs receive the signals from the ANC microphones 212, 214 and convert those analog amplitude signals to frequency-modulated signals at the respective carrier frequencies based on the references from PLL 302 and 306. The FM signals from the VCOs 304 and 308 are output as a combined mic output signal 310. As in the previous example, the signal from the main microphone 210 is an unmodulated analog amplitude-based signal though in some implementations, signal from microphone 210 may be modulated too or at least modulated when a carrier is present. One advantage of this arrangement is the backwards compatibility with older systems that do not employ a carrier. By directly modulating the microphone bias current, microphone 210 ensures backwards compatibility.

With an input carrier signal of, for example, 192 kHz, the headset 300 may generate carrier frequencies at multiples of the input carrier signal, such as at 192 kHz, 384 kHz, 576 kHz, etc. In some embodiments it may be advantageous to use channels at 1 MHz or above (e.g. between 1-2 MHz) to obtain better linearity in the VCOs 304 and 308. Because there are no FM radio stations in the low MHz range, there would be little risk of interference. Practical experiments have shown that 4 MHz is the lower limit for Audio Break Through (ABT) EMI problems. This type of EMI test employs the injection of a modulated carrier in the frequency range 0.15-80 MHz and since there are no FM signals in the low MHz range and ABT tests generally pass below 4 MHz, 0.1-4.0 MHz is one suitable range for frequency modulated microphone signals. Placing the channels between 1-2 MHz would also avoid potential interference from any commercial 2.3-2.8 MHz infrared (IR) systems utilizing FM modulation.

Reference is again made to FIGS. 3 and 4, which show embodiments involving time-domain multiplexed ANC microphone signals. The switching/sampling frequency selection may be partly based on the fact that the microphone signals have a bandwidth of about 20 kHz. Taking into account the Nyquist sampling theorem, a sampling frequency of at least 40 kHz should be used, plus some safety margin to avoid aliasing. With N channels, the sampling should be at least N*40 kHz.

On the other hand, if the switching/sampling occurs too fast, then settling time and EMI may start to pose a problem. As noted above, EMI starts to pose a problem at about 4 MHz. If a minimum sampling rate N*48 kHz is assumed, then a suitable usable range may be found between 100-1000 kHz. A suitable sampling rate, in one embodiment may be 384 kHz. Such a frequency may work well with both the standard 19.20 MHz telecom clock and standard 12.288 MHz audio clock systems, as might be found in a handheld mobile device or other computing device to which the headphones are connected. The switching clock can be obtained with by integer division of the clock signal, i.e. 0.384 MHz=12.288 MHz/32 and 0.384 MHz=19.200 MHz/50.

The power for the switching operation may be obtained from the microphone bias supply. The current needed for the switching operation may be 20-60 µA, which is a fraction of the overall microphone bias supply budget (200-500 µA).

It will be understood that there will be a finite settling time to the switching operation. Each microphone may behave slightly different and have different operating points since each may have a slightly different internal transistor and a different acoustic environment. The difference between microphones may be significant enough to produce a difference of 100 mV between the microphones (10 mV may be more typical, but 100 mV may be used for design purposes as a worst case budget). Based on this difference, the time constant for settling time due to charging is dT=100 mV*220 pF/250 nA=88 ns, where 220 pF is the rough capacitance attributable to one of the microphones, and 250 µA represents the current through one of the microphones (in a two-microphone embodiment). The 220 pF estimate is only partly attributable to capacitance of the JFET internal to the microphone (about 15-20 pF), the main part is based upon the need for EMI filtering and the intrinsic cable capacitance, which introduces 200 pF or more of capacitance to the circuit. If the switching period is about 3000 ns (which corresponds to a switching frequency of around 333 kHz), then the overlap for settling time is about 2.9%. If the internal capacitance is increased to 330 pF, then the overlap is about 5%, which is still a manageable level. With a higher sampling frequency, there will be greater overlap and the settling time may become a concern with sufficiently high switching frequency.

Another design consideration is the kT/C noise. Whenever a capacitor is charged, there will be some thermal noise on the capacitor due to thermal noise in the charging path. This noise can be calculated as kT/C, where k is the Boltzmann constant, T is the temperature in Kelvin and C is the capacitance as measured in Farads. The acoustic sound pressure level may be measured in dB SPL. The normal dynamic range of a standard electret microphone is about 60 dB as measured with 94 dB SPL as reference. Thus, the normal noise level of a standard electret microphone is about 34 dB SPL. Here, the design produces a sensitivity of −38 dBV @ 94 dB SPL. Thus the equivalent noise level from the switching operation (4.290/from 220 pF) indicates a kT/C level equivalent to 24.6 dB SPL noise. This is significantly below the normal expected noise level of a standard telecom microphone. Thus, the switching operation does not substantially increase the noise level. One factor that may be adjusted in some embodiments is the value of the bias resistor i.e. the output impedance of the microphone bias generator. This may be set to be about double the 'normal' value, e.g. around 4-5 kΩ instead of the industry standard value of 2.2 kΩ. By increasing the bias voltage to 3.0-3.3 V and increasing the bias generator output impedance, it may be possible to gain 6-8 dB of signal gain. The bias generator output impedance should be chosen carefully since with a much higher output impedance there is a risk that it is not possible to measure the highest sound pressure levels properly due to saturation of the output signal.

As mentioned above, the adding capacitance to the microphone may be used for EMI filtering. A larger capacitor will reduce kT/C switching noise, but larger capacitance also impacts settling time and the potential overlap between channels and limits the frequency response of the microphone. In some implementations, ferrite beads may be used. The electrostatic discharge (ESD) triggering value should be 5V or more for ESD protection components in many embodiments in order to avoid ABT problems.

If the distortion from the microphone at high signal levels is a concern, the biasing resistor may be reduced to lower values to allow a higher signal swing by reducing the sensitivity. In one embodiment, this may be implemented through slowly modulating a PMOS transistor, which effectively works as a variable bias resistor. In such an embodiment, to avoid too much distortion from the changing bias resistance, the modulation should be slow. Such modulation may permit the recording of loud acoustic levels while still ensuring low noise is present at low signal levels. This way, the output impedance of the bias generator would be high at low acoustic levels and lower at higher acoustic levels, thereby providing Automatic Gain Control (AGC) action directly at the sensor. This would simultaneously improve dynamic range and signal-to-noise ratio (SNR).

One example set of parameters for a set of illustrative embodiments using different filter capacitors is set out in the table below:

| Filter* capacitor [pF] | kT/C noise [μV] | Noise dB SPL @ −38 dB | Settling time [μs] | Overlap 384 kHz | Overlap 512 kHz | Overlap 768 kHz |
|---|---|---|---|---|---|---|
| 200 | 4.50 | 25.06 | 0.251 | 9.65% | 12.86% | 19.29% |
| 300 | 3.67 | 23.06 | 0.377 | 14.47% | 19.29% | 28.94% |
| 400 | 3.18 | 22.05 | 0.502 | 19.29% | 25.72% | 38.58% |
| 500 | 2.84 | 21.08 | 0.628 | 24.11% | 32.15% | 48.23% |

The temperature has been assumed to be 20° C. (293K) in the calculations. Note that the headphone cable will contribute about 120 pF of lumped capacitance by itself. The value depends on the cable, its length and construction (typically 1 pF/cm cable length). The filter capacity values shown in the above table include this lumped capacitance. The settling time is based upon 120 dB SPL and assumes decent matching between microphones. The overlap between channels assumes a total of six audio channels. This is the maximum number of channels that are possible given a 48 kHz sample requirement and a 384 kHz switching frequency (compatible with both 12.288 and 19.20 MHz clock frequencies).

One of the timeslots may be used for digital signaling, e.g. I$^2$C style signaling (e.g. serially transmitting and receiving control information), for simple read and write commands. In some instances, this signaling slot may also be used for audio and only interrupted for messaging on occasion. Any digital messaging should be sent infrequently to avoid introducing audio noise. Moreover, any digital logic included should as much as possible be implemented with constant or nearly constant current consumption when not active and as constant as possible while active to avoid noise and interference (e.g. from ground bounce). In some instances, a PLL may be used to synchronize the headset to the ANC processing unit to which it is connected. In a further embodiment, one of the timeslots may be used as a ground reference from the microphones, thereby decreasing sensitivity to EMI and reducing crosstalk.

It will be appreciated that with the foregoing embodiments the ANC processing is carried out in a handheld device or other processing/computing device to which the headphones or headset is connected. The handheld device may, in some embodiments, include a smartphone, handheld audio playback device (e.g. MP3 player), tablet, phablet, or laptop computer. In some embodiments, the processing/computing device may include a desktop or other computer, an audio entertainment system or stereo, an in-flight entertainment system, a dedicated ANC processing device or system, or some other computing device. References below to the ANC processing device include all of these possible embodiments.

The ANC processing device that receives the time-domain multiplexed signal may include a single A/D converter for all channels. In some embodiments, the ANC processing device includes a decimation filter, which also may be time-shared between channels. In some implementations, the ANC operation may be performed entirely in the analog domain, in which case the correction/compensation signals are formed using analog methods (e.g. adaptive switched FIR/IIR filters).

As mentioned above, ANC is often helpful in the context of airline flights. The ambient cabin noise can cause passenger discomfort and can impair passengers' ability to enjoy inflight audio-visual entertainment using the in-flight entertainment system. At present, it is impractical to provide passengers with ANC-equipped headphones due to the high cost associated with including ANC capability in every set of headphones. Accordingly, in one aspect, the present application proposes to provide ANC processing functionality and circuitry within the aircraft itself and to rely upon the headphones to simply supply the analog microphone signals. The aircraft may supply the headphones with power sufficient to bias the ANC microphones, thereby obviating the need for battery-powered headphones.

In some embodiment, the ANC processing circuitry is provided in the armrest or other portion of the seat proximate the audio socket. Using analog multiplexing headphones, as described herein, the audio jack may be a conventional 4-terminal audio jack, although in some cases, the audio jack may be 5-terminal audio jack and the headphones may not use analog multiplexing, e.g. by supporting two speakers, two microphones and a ground line using 5 terminals.

In particular implementations, the above-described ANC processing may be implemented as a component of an airline entertainment system, for example, a device which outputs sound to headset, with associated audio socket located in an armrest of an airplane seat, and the remaining components located in one or more of the airplane seats, the armrest itself and/or in an in-flight entertainment system. In other implementations, audio socket can be located in another physical position different from the armrest, the other physical location being in close proximity to a passenger seat and/or an in-flight entertainment system.

Figure 7:
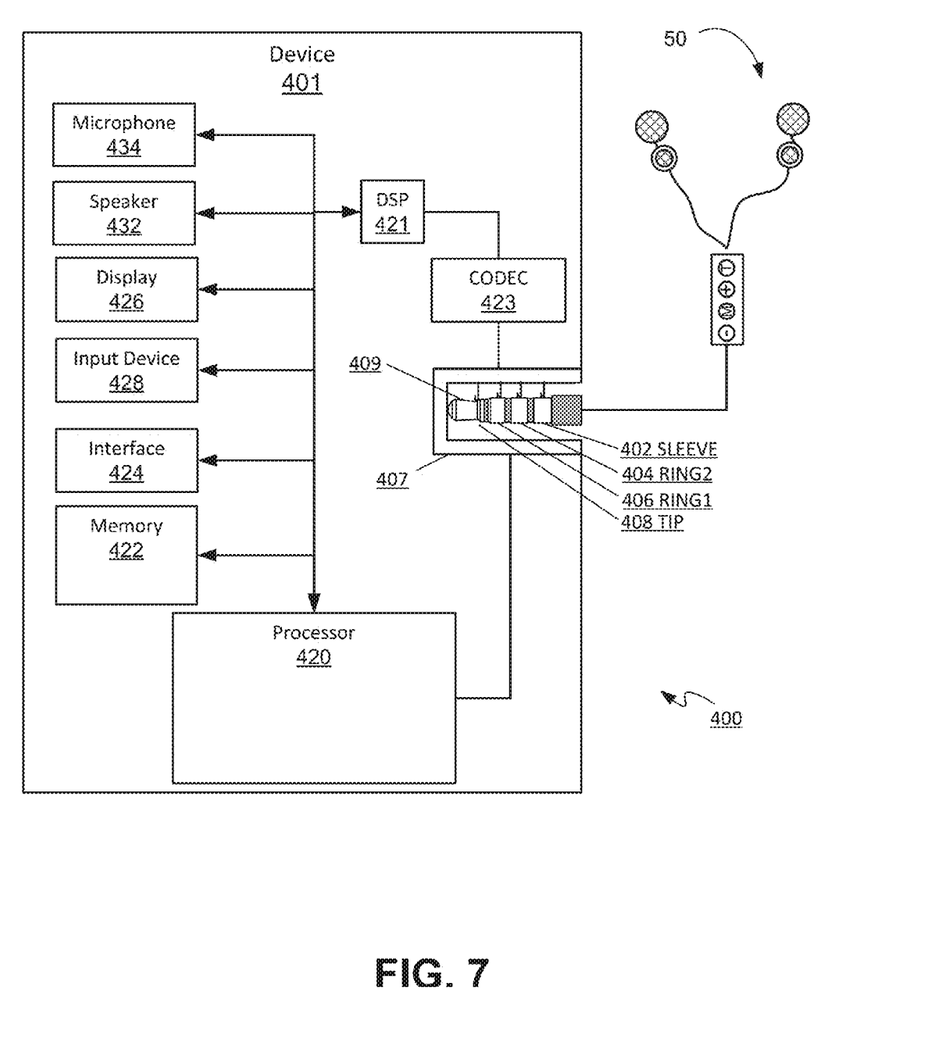
FIG. 7 shows a simplified diagram of an example computing device having an audio jack.
Figure 8:
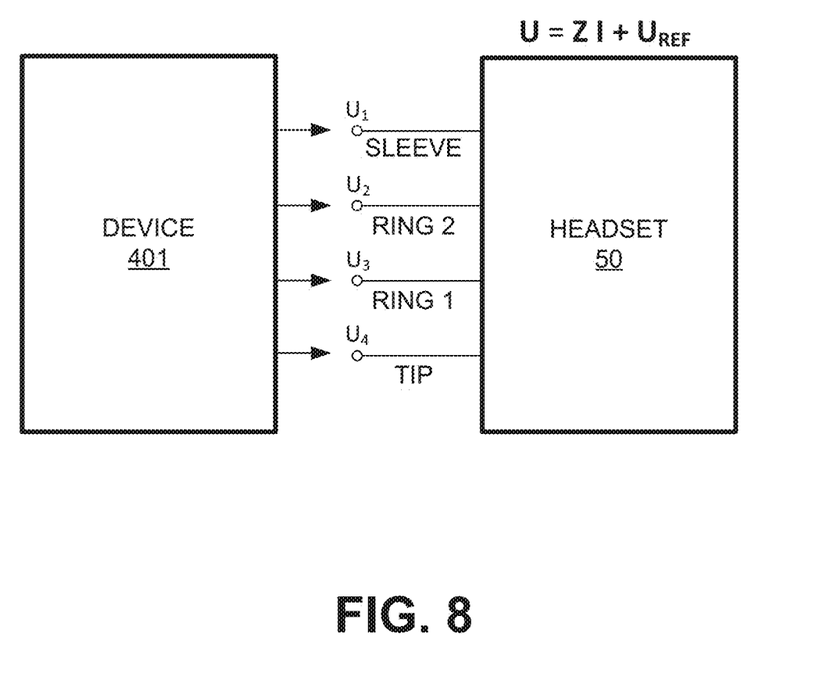
FIG. 8 shows a simplified diagram of an example computing device and audio headset.

Reference is now made to FIGS. 7 and 8. FIG. 7 shows a simplified block diagram of an example device 401 for carrying out ANC processing in connection with connected headphones 10 or headset 50. FIG. 8 shows an example block diagram of the device 401 and headset 50.

Device 401 includes a processor 420, digital signal processor (DSP) 421 and codec 423. An audio socket 407 is configured to receive an audio plug 409, which connects the socket 407 to headset 50. The device 401 further includes a microphone 434, speaker 432, display 426, input device 428, interface 424, and memory 422. The audio plug 409 in this example is a typical TRRS (tip, ring, ring, sleeve) plug having four connectors: tip 408, ring 1 406, ring 2 404, and sleeve 402.

While codec 423, DSP 421 and processor 420 are depicted as separate components of device 401, in other implementations, codec 423, DSP 421 and processor 420 can be combined into a single processor and/or implemented as multiple processors. In particular, each of codec 423, DSP 421 and processor 420 comprise hardware processors and/or hardware components. Indeed, codec 423, DSP 421 and/or processor 420 can be implemented as a plurality of processors, including but not limited to one or more central processors (CPUs)). Codec 423, DSP 421 and/or processor 420 can further comprise one or more hardware processors. Codec 423, DSP 421 and/or processor 420 are configured to communicate with memory 422. Memory 422 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 401 as described herein are typically maintained, persistently, in memory 422 and used by codec 423, DSP 421 and/or processor 420 which make appropriate utilization of volatile storage during the execution of such programming instructions. Those skilled in the art will now recognize that memory 422 is an example of computer readable media that can store programming instructions executable using codec 423, DSP 421 and/or processor 420, and in particular a non-volatile computer readable medium. Furthermore, memory 422 is also an example of a memory unit and/or memory module.

In particular, DSP 421 and/or processor 420 can be configured to one or more of: process a binaural audio received from first microphone 16 and second microphone 18; and behave as an active noise cancellation unit to process audio data from the headset 50 to produce a noise cancellation signal, and insert the noise cancellation signal into sound data output to the left speaker 12 (FIG. 2) and the right speaker 14 (FIG. 2).

DSP 421 and/or processor 420 can be further configured to determine when audio plug 409 is received in socket 407, for example by determining a change in impedance across one or more of connectors 402, 404, 406 & 408.

For example, DSP 421 and/or processor 420 can be configured to: measure an impedance between at least two contact points of plug 409, for example connectors corresponding to tip 408 and ring 2 404, and may determine that audio plug 409 is received in socket 407 when the impedance meets a threshold impedance condition, for example, when the measured impedance is similar to an impedance associated with the left speaker 12 (e.g. about 32Ω).

In particular, headset 50 can be modelled mathematically as an impedance matrix that is connected to socket 407. The contents of this matrix can be determined by DSP 421 and/or processor 420 of device 401 performing a series of voltage or current measurements of respective connectors of plug 409, based on voltage or current stimuli, in any suitable combination to perform impedance measurements of headset 50 and/or any other accessory connected to socket 407. In some implementations, the impedance measurements can be based on linear measurements, while in other implementations the measurements can be based on different current and/or voltage stimuli, configured to detect nonlinearities in impedance.

For example, with reference to FIG. 8, device 401 may determine elements U1, U2, U3 and U4 of an impedance matrix U by measuring impedance on each of connectors 402, 404, 406 & 408. The impedance matrix can then be represented by U=Z I+Uref, where U, Uref and I are vectors and Z is the impedance matrix, which can be used for modelling binaural headsets. In particular, the impedance matrix can be represented as follows, assuming a reference voltage is zero:

$$\begin{matrix} U_1 \\ U_2 = 0 \\ U_3 \\ U_4 \end{matrix} = \begin{matrix} Z_{MICI} & 0 & 0 & 0 \\ 0 & 0 & 0 & 0 \\ 0 & Z_{SPKR} & 0 & 0 \\ 0 & 0 & Z_{SPKL} & 0 \end{matrix} \begin{matrix} I_1 \\ I_2 \\ I_3 \\ I_4 \end{matrix}$$

This assumes that the ground connection on RING2 (connector 404) is set to 0 volts (i.e. U2=0), and that test currents are applied to the remaining connectors of plug 409 (corresponding to connectors 402 (SLEEVE, U1), 406 (RING1, U3), 408 (TIP, U4) by device 401 to measure a resulting voltage. RING2 (connector 404) (i.e. U2=0 in the impedance matrix) can comprise a return path for the currents. Hence, $I_2=I_1+I_3+I_4$ using Kirchoff's law.

Insertion of plug 409 into socket 407 can be determined by measuring the impedance between the respective connectors 404 & 408 corresponding to the TIP and RING2 connectors in order to find the impedance $Z_{SPKL}$. This can be performed by grounding connector 404 corresponding to RING2 and applying a voltage on connector 408 corresponding to TIP using a voltage generator of device 401 with high output impedance and measuring the voltage on connector 408 corresponding to TIP while floating all other connectors of plug 409 except connector corresponding to TIP. Hence, when a four-connector or three-connector plug is received at socket 407, the voltage at connector 408 corresponding to TIP will decrease substantially. In other implementations, the respective connectors 408 corresponding to U4 can be set to 0 Volts and a current or voltage source can be applied to the other respective connectors of plug 409, e.g. 406, thereby forcing a current through the impedance determined by ($Z_{SPKL}+Z_{SPKR}$) and detecting a valid headphone impedance (i.e. not an open, neither a short). This can be used as an alternate method of determining the inserting and removal of an audio jack. An advantage of measuring the insertion at the connector corresponding to TIP is that this will first be detected when an audio plug is fully inserted into socket 407 and therefore, other values in the impedance matrix Z can reliably be measured without introducing arbitrary delays in the measurements to wait for the audio plug to be fully inserted. Inaudible detection can be achieved by spectrally shaping the detection pulses to have a spectral energy content below a human hearing threshold, e.g. by high pass filtering the detection pulses. When the four-connector audio plug 409 is received at socket 407, a current will flow through the microphones and the change can be measured. In the general case, any combination of applied current or voltages can be chosen and the corresponding change in voltage or current can be measured. Furthermore, a combination of voltage and current can be selected and spectrally shaped such that the testing is inaudible through speakers 12, 14. Hence, a simple and effective method for checking for plug insertion is provided. It is further noted that the matrix depicted above corresponds to a North American standard; when a European standard is applied, the matrix and measurements will be adapted accordingly.

In one embodiment, the headphones include a circuit or other such component for signaling the headphone-type so that the ANC circuitry is able to detect whether the headphones are ANC-capable despite the fact they are using a conventional 4-terminal plug. In some embodiments, the ANC test circuitry may interrogate the headphones upon connection to assess the headphone type. In one example, the circuitry may use a combination of impedance measurements (e.g. headphone type), nonlinear measurements (e.g. using different voltages for the impedance measurement), pulsing (e.g. providing or checking for high-frequency out-of-band tones), and reading active circuits (such as reading parameters or type ID from headphones supporting this functionality).

In yet another embodiment, the ANC circuitry is shared amongst two or more passengers. For example, the two, three or more passengers in a passenger row may have shared ANC circuitry for conducting the ANC processing and providing each passenger's headphones with the appropriate compensation/noise-cancellation signals.

In addition, as four-connector audio plugs are generally backwards compatible with three-connector audio sockets, the present four connector headset 50 is also backwards compatible with three-connector audio sockets. However, in some implementations of three-connector audio sockets, backwards compatibility of headset 50 is achieved by adapting headset 50 to include a switch which, when actuated, electrically shorts right microphone sleeve connector 28 with ground ring connector 24; for example, such a switch can comprise a slider ground switch. This is the case in some in-flight systems with three-connector audio sockets, where the ground connection may be placed in the middle between RING2 and SLEEVE or even only touching SLEEVE. In this case, a reliable ground connection is obtained by shorting RING2 and SLEEVE, e.g. using a slider switch.

In some implementations where headset 50 is used with an in-flight entertainment system, the in-flight entertainment system is generally adapted to include an ANC device and/or processor and/or circuit, which can be one or more of: located in a dongle providing an interface to legacy in-flight entertainment systems (which can include a battery and/or a DSP), located inside an armrest, centrally located at in-flight equipment and/or located at a handheld device in communication with an in-flight entertainment system, using a wired or wireless connection.

In some of these implementations, an audio socket at an armrest provides connectivity to a centrally located ANC circuit.

In general, such in-flight entertainment systems can include one ANC device for each seat of an associated airplane. However, in other implementations, a single functional ANC unit can provide the ANC functionality for two or more audio sockets in armrests of airplanes, thereby reducing cost and space, e.g. by providing the processing for a row of closely seats and/or closely located seats.

In some of these implementations, in-flight entertainment systems that includes in-flight ANC support in the armrest, and the like, may include a circuit for automatic headset/headphone detection to determine whether connected headsets have no microphones, one microphone or more microphones, and/or whether or not a connected microphone conforms to a North American standard or a European (or other) standard, for example using the matrix method described above possibly supplemented by digital detection methods. Hence, such a system would identify what type of headset is being connected at an audio socket, and responsively: configure itself for compatibility with the type, and enable ANC when ANC functionality is supported by the headset. In some cases, the system may read memory located in a headset in order to obtain additional information about the headset e.g. about the acoustic transfer function between microphone and speaker, for example memory 44 or to provide tuning profiles and/or head related transfer (HRF) functions customized for a specific brand or information about what airline(s) the headset supports.

It will be appreciated that the processes and systems according to the present application may be implemented in a number of computing devices, including, without limitation, servers, suitably-programmed general purpose computers, and mobile devices. The processes may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the devices described herein and the module, routine, process, thread, or other software components implementing the described methods/processes may be realized using standard computer programming techniques and languages. The present application is not limited to particular processors, computer languages, computer programming conventions, data structures and other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. Headphones to enable active noise cancellation, comprising:
   left and right speakers contained in left and right speaker housings;
   at least one microphone in the left speaker housing and at least one microphone in the right speaker housing, each microphone producing a respective microphone signal;
   an analog multiplexer for multiplexing the respective microphone signals into a combined signal; and
   a multi-wire cord having a ground wire, a left speaker signal wire coupled to the left speaker, a right speaker signal wire coupled to the right speaker, and a microphone output wire coupled to the analog multiplexer to receive the combined signal, wherein the multi-wire cord terminates in an audio plug,
   and wherein the analog multiplexer is coupled to one of the left speaker signal wire or the right speaker signal wire to receive a frequency signal extracted from a speaker signal, and wherein the multiplexer multiplexes the respective microphone signals into the combined signal under control of a frequency of the frequency signal supplied by the speaker signal.

2. The headphones claimed in claim 1, wherein the multi-wire cord terminates in a 4-terminal audio plug.

3. The headphones claimed in claim 1, wherein the analog multiplexer comprises a time-domain analog multiplexer.

4. The headphones claimed in claim 3, wherein the time-domain analog multiplexer comprises a switch for time-multiplexing the respective microphone signals into the combined signal.

5. The headphones claimed in claim 4, wherein the switch operates under control of the frequency of the frequency signal supplied by the speaker signal, and wherein the frequency is greater than 100 kHz.

6. The headphones claimed in claim 5, wherein the frequency of the frequency signal supplied by the speaker signal is carried on one of the left speaker wire or the right speaker wire.

7. The headphones claimed in claim 4, wherein the switch comprises an NMOS transistor coupled between one of the microphones and the ground wire.

8. The headphones claimed in claim 5, wherein the switch comprises a PMOS transistor coupled between one of the microphones and the microphone output wire.

9. The headphones claimed in claim 1, wherein the analog multiplexer comprises a frequency-domain multiplexer.

10. The headphones claimed in claim 9, wherein the frequency-domain multiplexer includes a phase-locked loop to receive the frequency of the frequency signal supplied by the speaker signal and to produce a mixing signal at a set frequency, and a mixer to shift one of the respective microphone signals to the set frequency.

11. The headphones claimed in claim 10, wherein an input to the phase-locked loop is coupled to one of the speaker signal wires to receive the frequency of the frequency signal supplied by the speaker signal.

12. The headphones claimed in claim 9, wherein the frequency-domain multiplexer includes a phase-locked loop to receive the frequency of the frequency signal supplied by the speaker signal and to produce a mixing signal, and a numerically-controlled oscillator to receive the one of the respective microphone signals and to frequency-modulate said one of the respective microphone signals on a carrier at the set frequency.

13. The headphones claimed in claim 12, wherein an input to the phase-locked loop is coupled to one of the speaker signal wires to receive the frequency of the frequency signal supplied by the speaker signal.

14. The headphones claimed in claim 1, further including at least one additional microphone.

15. A headset to enable active noise cancellation, comprising:
    left and right speakers contained in left and right speaker housings;
    at least one microphone in the left speaker housing and at least one microphone in the right speaker housing, and a third microphone, each microphone producing a respective microphone signal;
    an analog multiplexer for multiplexing the respective microphone signals into a combined signal; and
    a multi-wire cord having a ground wire, a left speaker signal wire coupled to the left speaker, a right speaker signal wire coupled to the right speaker, and a microphone output wire coupled to the analog multiplexer to receive the combined signal, wherein the multi-wire cord terminates in an audio plug,
    and wherein the analog multiplexer is coupled to one of the left speaker signal wire or the right speaker signal wire to receive a frequency signal extracted from a speaker signal, and wherein the multiplexer multiplexes the respective microphone signals into the combined signals under control of a frequency of the frequency signal supplied by the speaker signal.

16. The headset claimed in claim 15, further comprising one or more switches coupled between the ground wire and one or more microphone signal lines, wherein the switches are actuable to change impedance levels sensed by a connected device so as to provide audio control.

17. The headset claimed in claim 16, wherein the switches include at least one of a volume switch, mute switch, or push-to-talk switch.

18. The headset claimed in claim 15, wherein the analog multiplexer comprises a time-domain analog multiplexer.

19. The headset claimed in claim 15, wherein the analog multiplexer comprises a frequency-domain multiplexer.

20. Headphones to enable active noise cancellation, comprising:
    at least two speakers;
    at least two microphones, each microphone producing a respective microphone signal;
    an analog multiplexer for multiplexing the respective microphone signals into a combined signal; and
    a multi-wire cord having a ground wire, at least two speaker signal wires each coupled to a respective one of the speakers, and a microphone output wire coupled to the analog multiplexer to receive the combined signal, wherein the multi-wire cord terminates in an audio plug,
    and wherein the analog multiplexer is coupled to one of the at least two speaker signal wires to receive a frequency signal extracted from a speaker signal, and wherein the multiplexer multiplexes the respective microphone signals into the combined signal under control of a frequency of the frequency signal supplied by the speaker signal.

* * * * *